Patented June 28, 1927.

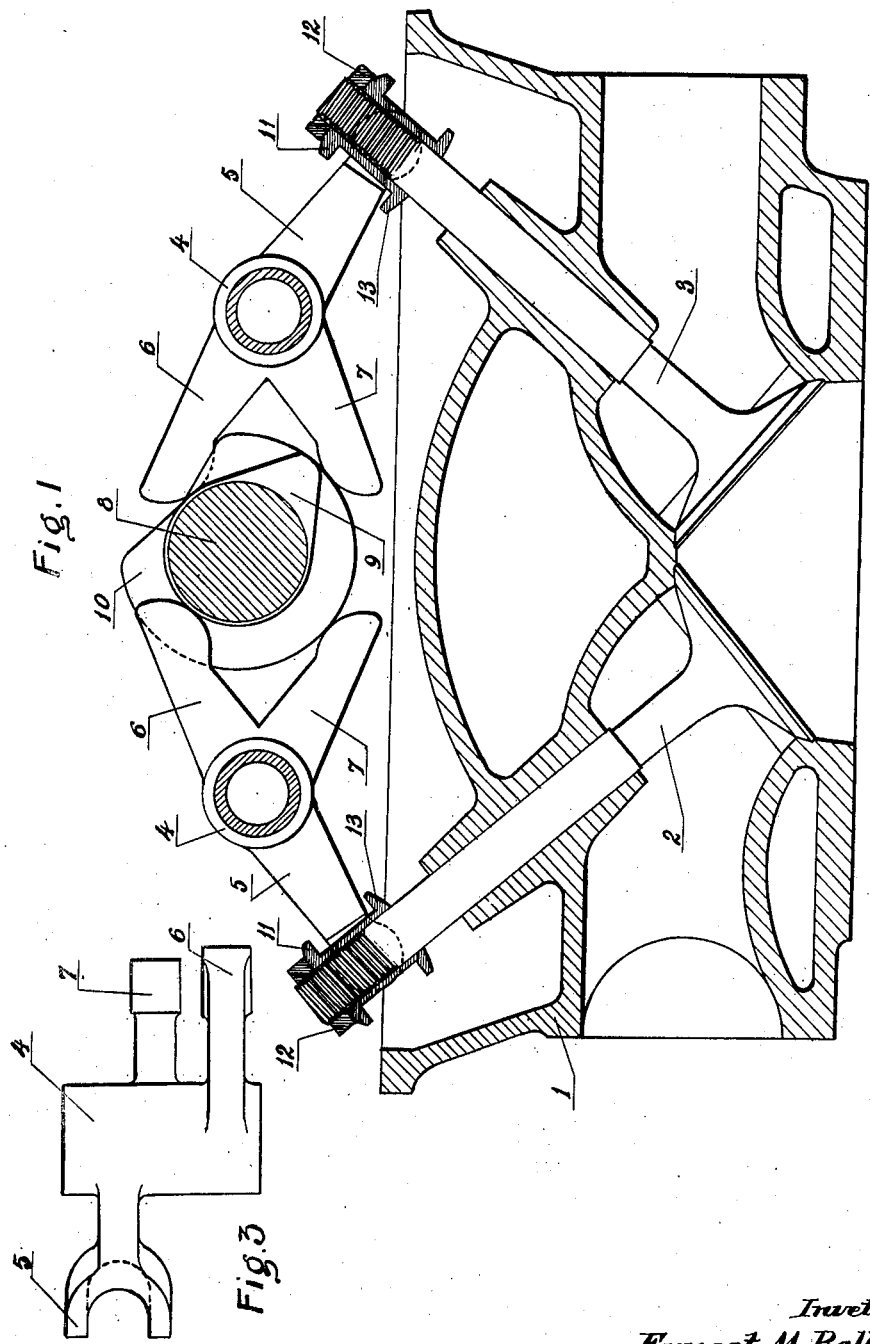

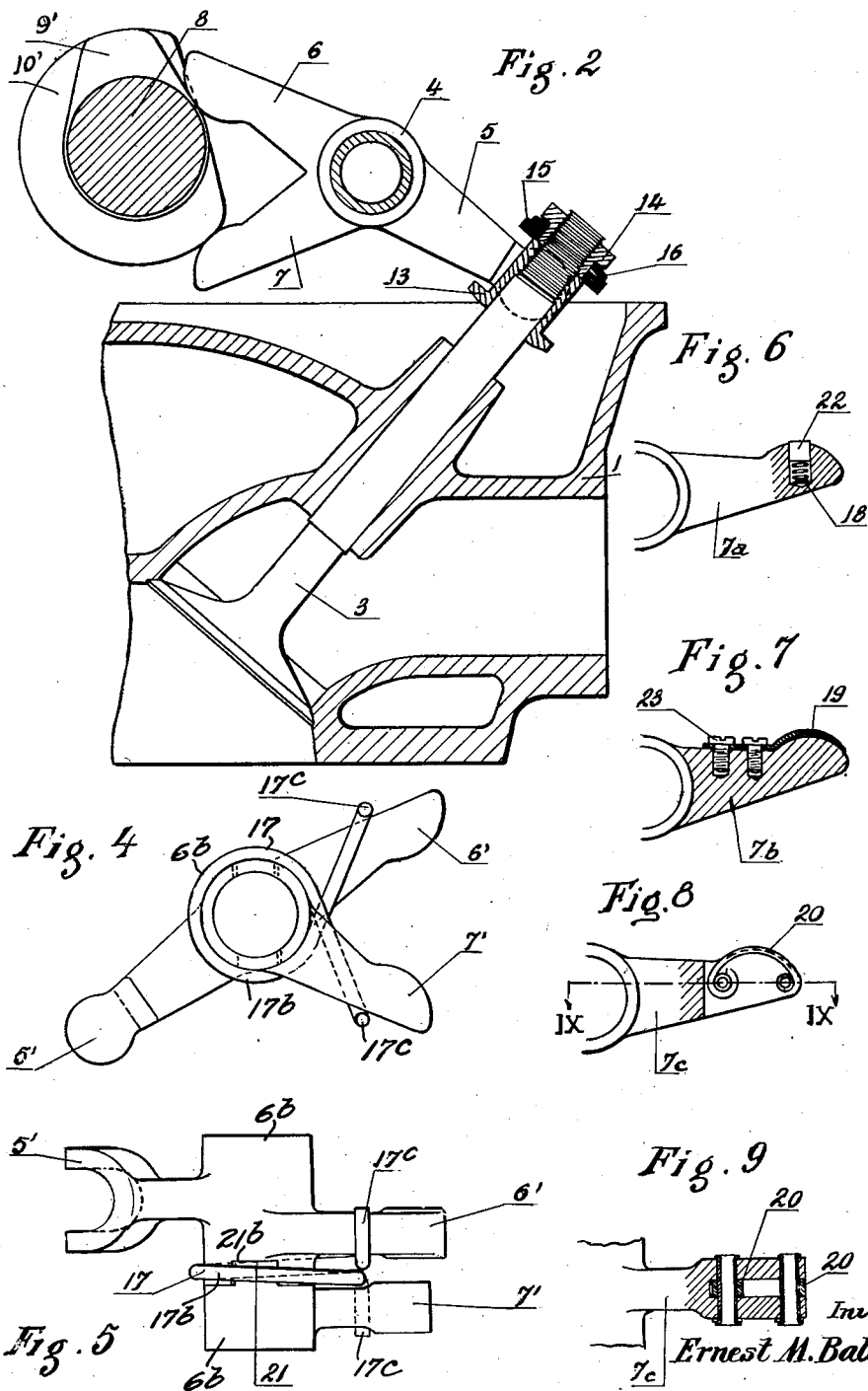

1,633,882

UNITED STATES PATENT OFFICE.

ERNEST MAURICE BALLOT, OF PARIS, FRANCE

VALVE-OPERATING MECHANISM.

Application filed October 26, 1925, Serial No. 64,952, and in France November 17, 1924.

The present invention relates to an arrangement for the control of valves in internal combustion engines, wherein the valves are opened and closed in a simple and positive manner.

For this purpose, the stem of each valve is connected with one of the arms of a rocker having three branches, the other two being respectively held in contact with two cams of suitable shape which are mounted upon the cam shaft of the engine.

The elastic closing of the valve may be obtained by means of a suitable spring which is mounted upon the valve stem between two collars whereof one is movable and is in permanent contact with the co-operating arm of the said rocker. For a like purpose, the device may be so arranged that the rocker arm which is actuated by the said cam for closing purposes is provided with a spring having a limited movement and assuring the permanent contact between the said arm and the cam whereby an absolutely noiseless working of the valve gear will be obtained.

During the operation, the pivoting motion of the said rocker is thus effected in both directions by the two arms in contact with the said cams, so that a double control of the valves will be thus assured.

The said invention is set forth by way of example in the appended drawings wherein various embodiments are represented.

Fig. 1 is a sectional view of the cylinder head of an engine comprising positively controlled valves according to the said invention.

Fig. 2 is a partial section of a cylinder head comprising a valve with elastic closing.

Fig. 3 is a plan view of a three-armed rocker analogous to what is shown in Fig. 1.

Figs. 4 and 5 show a rocker consisting of two parts assembled by teeth and held in place by a spring.

Figs. 6, 7, 8 and 9 show three modifications of the arrangement of a spring at the end of the arm controlling the closing of the valve.

In Fig. 1, 1 is a cylinder head carrying two inclined valves 2 and 3 which are controlled by three armed rockers 4; one arm—or tail piece—5 is mounted on the valve stem, whilst the other two arms 6 and 7 co-operate respectively with the cams 9 and 10 mounted on the cam shaft 8. In the present example, the valve lifting cam 9 acts upon the arm 6 and the valve closing cam 10 upon the arm 7.

The set of cams 9 and 10 control the opening and closing of the inlet valve 2. The exhaust valve 3 is controlled by cams 9' and 10' which are not shown in Fig. 1 but are shown in Fig. 2.

In Fig. 1, the tail piece 5 of the rocker is connected with the valve stem by a ring 11 which is screwed to the end of said rod and comprises two cheeks having between them a fork situated at the end of the tail piece 5 (Fig. 3). After adjusting its position on the said rod, the ring 11 is held in place by the nut 12.

In a modification shown in Fig. 2, the ring 13 which is screwed upon the valve stem has but a single cheek, the second cheek consisting of a movable collar 15 serving as an abutment for a spring 16 which bears against the flanged part of a nut 14 screwed upon the valve stem and against the ring 13. The spring 16 has a deflection value which somewhat exceeds the maximum play allowed for the valve control so as to assure the requisite pressure only at the end of the closing period.

In Figures 4 and 5, I have shown mechanism whereby the arms may have a limited yieldable relative movement for the purpose of properly closing and opening the valve and capable of automatically compensating for wear. Each of the arms 6' and 7' has a hub 6$^b$ and to the hub of arm 6' is attached the tail piece 5'. Thus, it will be seen that the arms can be mounted for relative movements and for the purpose of controlling said movements I provide a projection 21 on one of the hubs engaging for a slight play in a recess 21$^b$ in the other hub. A spring 17 or other yieldable device has a coil 17$^b$ engaging around a hub and has hook shaped ends 17$^c$ engaging over and under the arms so as to yieldably force arms toward each other. This yieldable action is limited by the engaging action between the walls of the recess 21$^b$ and the projection 21.

Other means may be employed to obtain the same result, and Figs. 6, 7, 8 and 9 show three spring arrangements at the end of the closing arm of the said rocker. In Fig. 6 the spring 18 acts through the medium of a small plunger 22 which is contained in a recess formed in the end of the branch 7$^a$. In Fig. 7, the spring consists of a strip 19 which is secured to the arm 7ᵇ by the screws 23. In Figs. 8 and 9, the arm 7ᶜ of the rocker is slotted at the end, and a spring strip 20 is disposed in the slot and is held by the rivets 24.

The springs shown in Figs. 6 and 7, instead of being mounted on the arm 7, may be disposed upon the tail piece 5 and placed between the latter and the upper cheek of the ring 11.

Whatever may be the shape of the springs employed, the net deflection value of the spring must be very small, in order to assure the positive control during almost the whole of the closing period. The end of the closing arm being thus constantly in contact with the cam, the valve gear of the engine will be noiseless in all cases.

Obviously, the several embodiments of the invention hereinbefore set forth in detail are given solely by way of example, and are susceptible of constructional modifications in detail without departing from the principle of the invention.

Claim:

Valve operating mechanism comprising a pair of rocker arms each provided with a hub portion, a lug on one of said hub portions arranged for slight play in a recess in the other hub portion and a spring having a coil arranged around the hub portions and having hook shaped ends engaging said arms to yieldably force the same toward each other.

In testimony whereof I have hereunto set my hand.

ERNEST MAURICE BALLOT.